US007431897B2

(12) United States Patent
Hahne et al.

(10) Patent No.: US 7,431,897 B2
(45) Date of Patent: Oct. 7, 2008

(54) APPARATUS REPLACING ATMOSPHERIC OXYGEN WITH AN INERT GAS FROM A LAMINAR AIR BOUNDARY LAYER AND APPLICATION OF SAID APPARATUS

(75) Inventors: Lukas Hahne, Allschwil (CH); Franz Knopf, Buhl/Stadt (DE)

(73) Assignee: Eltex Elektrostatik GmbH, Rhein, DE (US)

( * ) Notice: Subject to any disclaimer, the term of this patent is extended or adjusted under 35 U.S.C. 154(b) by 897 days.

(21) Appl. No.: 10/760,551

(22) Filed: Jan. 21, 2004

(65) Prior Publication Data

US 2004/0184973 A1 Sep. 23, 2004

(30) Foreign Application Priority Data

Jan. 22, 2003 (DE) ................................ 103 02 367

(51) Int. Cl.
*B01J 19/08* (2006.01)

(52) U.S. Cl. .............................. 422/186.3; 422/186.04; 422/186; 204/164; 204/176; 204/155; 204/156

(58) Field of Classification Search ................. 422/186, 422/186.04, 186.3; 204/155, 156, 164, 176
See application file for complete search history.

(56) References Cited

U.S. PATENT DOCUMENTS 4,329,212 A * 5/1982 Obenshain ............... 204/157.5
4,946,568 A * 8/1990 Kalwar et al. ............... 204/164
6,285,032 B1 * 9/2001 Hahne et al. ............. 250/492.3

FOREIGN PATENT DOCUMENTS

| | | | |
|---|---|---|---|
| DE | 195 25 453 | A1 | 1/1997 |
| DE | 297 07 190 | U1 | 11/1997 |
| DE | 198 57 984 | A1 | 6/2000 |
| DE | 100 50 517 | A1 | 5/2002 |
| DE | 100 50 217 | A1 | 4/2004 |
| EP | 1199165 | * | 9/2001 |
| JP | 58-225133 | * | 12/1983 |
| SU | 1763024 | * | 9/1992 |

* cited by examiner

*Primary Examiner*—Rodney G McDonald
(74) *Attorney, Agent, or Firm*—Lowe, Hauptman, Ham & Berner, LLP

(57) ABSTRACT

The invention relates to apparatus replacing atmospheric oxygen with an inert gas such as $N_2$ from the minimum of one laminar air boundary layer of substrates moving in the direction of advance, for instance fast moving lines of material fitted with a first chamber which is only open toward the said substrate and otherwise is sealed off by the surrounding outer space, said first chamber comprising in the zone of its front sealing edge, transversely to the direction of advance, a front corona electrode fed with high DC voltage and associated with a front mate electrode on the other substrate side, and a further corona electrode on the same substrate side mounted on a further sealing edge transverse to the direction of advance, said further corona electrode being fed with high DC voltage and being associated with a further mate electrode on the other substrate side, and including a device feeding the said inert gas. The invention is characterized in that the inert gas feed device issues in the vicinity directly behind the partial-vacuum zone which is formed directly behind the electron/ion flow of the further corona electrode.

19 Claims, 4 Drawing Sheets

Figure 1:
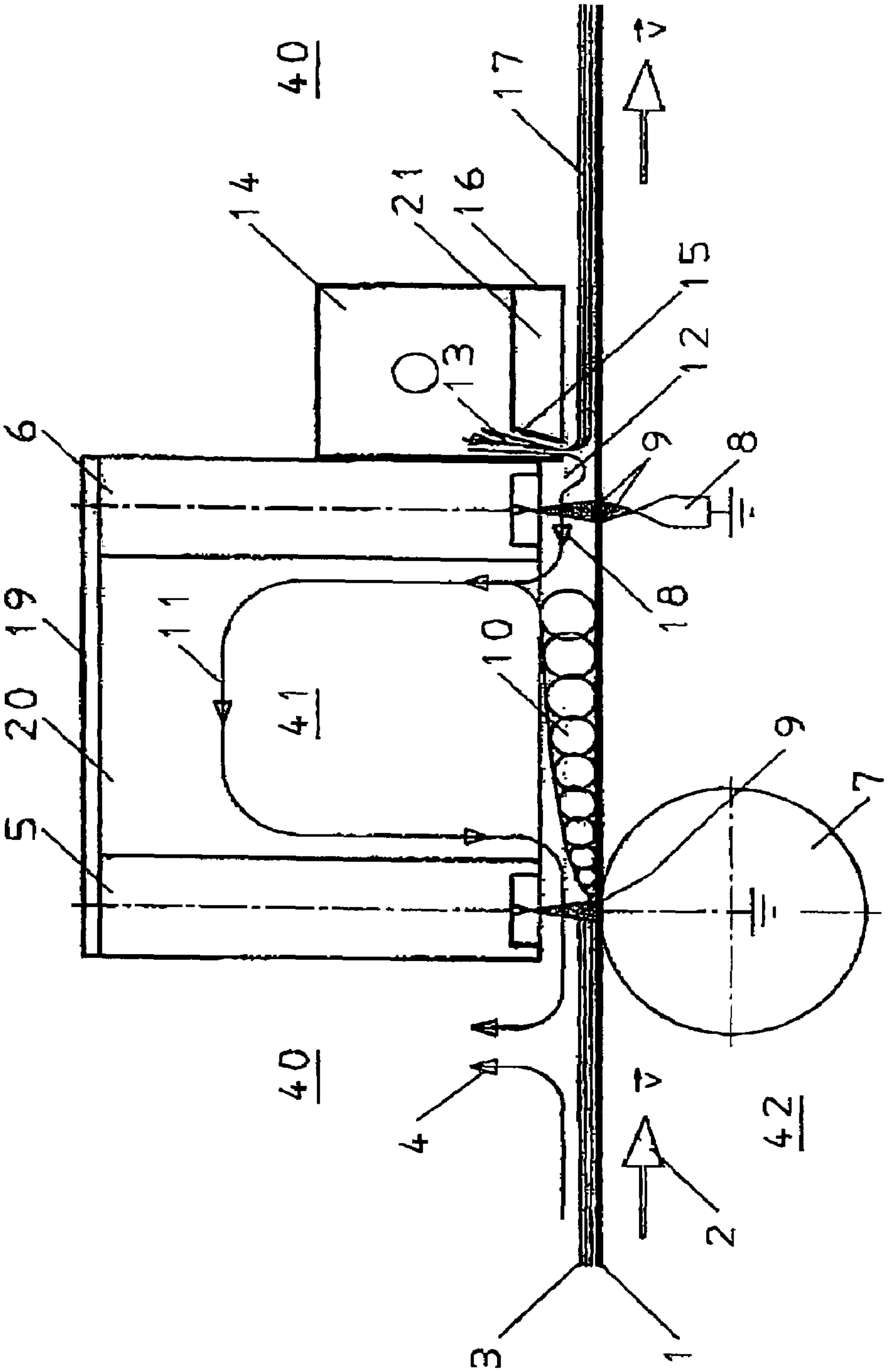

APPARATUS REPLACING ATMOSPHERIC OXYGEN WITH AN INERT GAS FROM A LAMINAR AIR BOUNDARY LAYER AND APPLICATION OF SAID APPARATUS

The present invention relates to apparatus defined in the preamble of the main claim, in particular to apparatus replacing the atmospheric oxygen by an inert gas such as nitrogen of substrates which move in their direction of advance on at least on one side of the laminar air boundary surface, said substrates illustratively being lines of material, said apparatus comprising a first chamber which is open only toward the substrate and otherwise is enclosed by the surrounding outside space, said first chamber comprising a sealingl edge which is situated forward as seen in the direction of advance and preferably running perpendicularly to said direction and to which is mounted a front corona electrode fed by a high DC voltage with a front mate electrode situated on the other side of the substrate, said first chamber also comprising behind the first corona electrode, and on the same side of the substrate as said first coronary electrode, a further corona electrode mounted on the rear sealing edge which also is transverse to the direction of advance, said further corona electrode being fed with high DC voltage and being associated with a further mate electrode on the other substrate side, and the present invention furthermore relates to a device feeding inert gases and to an application.

Such apparatus is known in sheet-offset printing machines (German patent document 100 50 217 A1) wherein however the first chamber is equipped with the inert-gas feeding device.

It is generally known about the drying (curing) of UV inks/lacquers that the atmospheric oxygen situated directly at the ink/lacquer surface together with the photoinitiators will form so-called free radicals hampering the original photoinitiator function, this phenomenon being called $O_2$ inhibition. Accordingly the presence of atmospheric oxygen entails higher quantities of expensive photoinitiators, making printing more expensive.

UV driers or plasma driers for the same reason are frequently designed as chambers which are flushed out with inert gases such as nitrogen. In such cases the intake and outlet gaps should be minimized in order to keep nitrogen losses within acceptable bounds. Such chambers are known per se (German patent documents 198 57 984 A1 and 297 07 190 U1).

The known apparatus within this species (DE 100 50 517 A1) as defined in the preamble of the present claim 1 is equipped with such a chamber that will be flushed with nitrogen. In this design, the chamber in the sheet offset printing machine is sealed by the corona electrode(s) mounted to the front resp. the rear sealing edges, said electrodes being connected to high DC voltages. Herein position-qualifying terms such as "front, rear, behind . . . " if not otherwise specified are understood to refer to the direction of advance. As regards the known apparatus of this species, the principle used therein converts the gaseous laminar air boundary layer entrained by a moving substrate by means of a corona electrode connected to a positive or negative high-voltage, and in cooperation with an associated mate electrode, into turbulent flow on the other substrate side (DE 195 25 453 A1).

The known apparatus of this species has not lived up to expectations. On one hand the nitrogen consumption is still high, thereby significantly raising the operating costs of the known apparatus. On the other hand, on account of the simultaneously low efficiency, much energy is needed for the dryer in the form of a UV radiator. Furthermore there remains the still large quantity of expensive photoinitiators.

The objective of the present invention is to further develop an apparatus of the above species defined in the preamble of the independent claim and to propose a pertinent application whereby the quantities of required inert gas and hence the operating costs may be substantially reduced.

This problem is solved with respect to apparatus of said species defined in the preamble of the independent claim by said claim's features, namely in that the inert-gas feeding device issues into the zone of partial vacuum being formed directly behind the flow of electrons/ions of the further coronary electrode.

The apparatus of the present invention may be used in printing machinery for gravure printing, flexographic printing, roller offset printing or sheet offset printing and as regards various coating procedures, for instance in the paper or textile industries which increasingly are using UV curing inks or lacquer printing means—generally termed UV curing systems. Said systems contain a given proportion of so-called photoinitiators. The curing/drying of such inks or lacquers is carried out in a UV drier. Depending on the UV inks/lacquers, the radiators will be narrow band, namely so-called UV excimer radiators, or broad band UV radiators. The photoinitiators absorb some of the applied UV radiation energy and trigger the polymerization/curing of the UV inks/lacquers. These processes also are called radiatiative-chemically curing systems. So-called plasma driers also are used in this respect, for which the energy of curing is generated by a high frequency corona discharge, while curing by electron beams also falls within the scope of the present invention.

In the present invention, the laminar air boundary layer entrained by the moving substrate arrives in the zone of the front corona electrode. The flow of electrons or ions, herein shortly termed the electron/ion flow, present at said electrode, generates conversion from a laminar into a turbulent state at the surface of that side of the moving substrate where the front corona electrode is also mounted. The flow of mostly turbulent entrained air dragged along by the laminar air boundary surface is deflected upward before the front corona electrode and away from the moving substrate. The turbulent air boundary layer forming behind the front corona electrode is deflected—behind and at a distance from the further corona electrode which is preferably configured parallel to the front corona electrode—except for a laminar residual boundary layer entrained farther by the substrate—upward and perpendicularly to the surface of the moving substrate within the first chamber and upward, as the main air flow, opposite the direction of advance—and back into the region of the first corona electrode. Because of the gaps between the individual electron/ion flows of the individual and adjacent tips of the front corona electrode, this main air flow returns—oppositely the direction of advance—outside the first chamber in the outer space surrounding latter and into the ambient and jointly with the air entraining flow rises before the front corona electrode perpendicularly to the substrate.

Because the turbulent air boundary layer is "scraped off" by the further corona electrode at the rear edge of the first sealed off chamber, a partial vacuum zone is produced behind the further corona electrode mounted there. The inert gas feed device issuing into the this partial vacuum zone to some extent sucks this inert gas into said zone and as result a new laminar layer, this time however a laminar inert gas boundary layer of low turbulence, builds up above the moving substrate. If the quantity of inert gas required to adequately render inert the laminar inert gas mixture is adjusted as a function of the speed of the moving substrate in such manner that a slight leakage flow of inert gas moves opposite the direction of advance and jointly with the deflected main air flow in the first chamber shall finally escape from it into the ambience, then the original partial vacuum zone behind the further corona electrode will entirely fill with inert gas, as a result of which a slight excess pressure is produced which precludes that a flow of air shall be sucked out of the outside space enclosing the first chamber.

By using the apparatus of the present invention, the inert gas consumption to render inert the inert gas boundary layer near the substrate path to the rear of the further corona electrode may be reduced up to 80% relative to the state of the art, this saving in operational costs being significant. Because of the low residual oxygen content in the boundary layer near the substrate path, the quantity of expensive photoinitiators may also be reduced further. At the same these savings are simultaneous with a drop in the bothersome odors emanating from the photoinitiators. Consequently products may be manufactured in the future for which heretofore such odors could not be tolerated on hygienic grounds.

Another significant improvement offered by the apparatus of the present invention relating to its advantageous nature is attained by configuring a further chamber, preferably identical with the first one, between the further corona electrode and the Inert-gas feed device. Said second chamber most of the time will allow eliminating the laminar residual boundary layer: this feature is foremost significant at higher speeds of the moving substrate.

Advantageously a drier in the form of a UV radiator shall be configured directly to the rear of the inert-gas feed device. Because of the low oxygen content in the inert gas layer near the substrate path, and simultaneously with very low oxygen consumption, the UV radiation power required for adequately curing the UV inks and/or UV lacquers can be reduced by about 40% relative to the state of the art. Besides saving electrical energy, the infrared portion of broadband UV radiators will be reduced also, this feature being advantageous when processing heat-sensitive substrates such as PE foils.

If, in an appropriate configuration of the present invention, a sealing corona electrode together with the pertinent mate electrode is mounted on the other substrate side and behind the UV radiator, and if this sub-assembly is encapsulated in the manner of a chamber, then the mostly turbulent, entrained flow substantially consisting of inert gas and situated above the inert gas boundary layer can be fed back into said encapsulated chamber in a direction opposite that of advance, whereby a portion of this inert gas is made available again to the laminar inert gas boundary layer. The reason for such feedback is the low impedance of the electron/ion flow generated by the sealing corona electrode. On account of the related slight rise in pressure in the encapsulated chamber, further reduction of inert gas consumption maybe attained.

Further appropriate embodiment modes and developments of the present invention are featured in the dependent claims.

One illustrative embodiment of the present invention is elucidated below in relation to the appended drawing.

Figure 2:
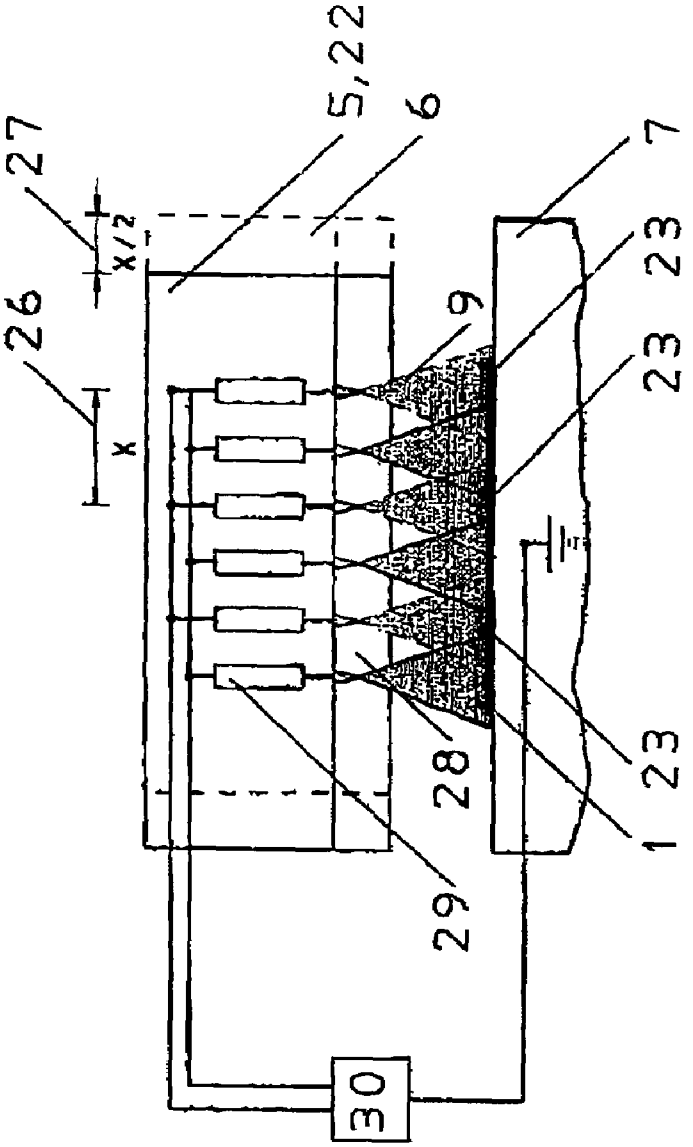
Figure 3:
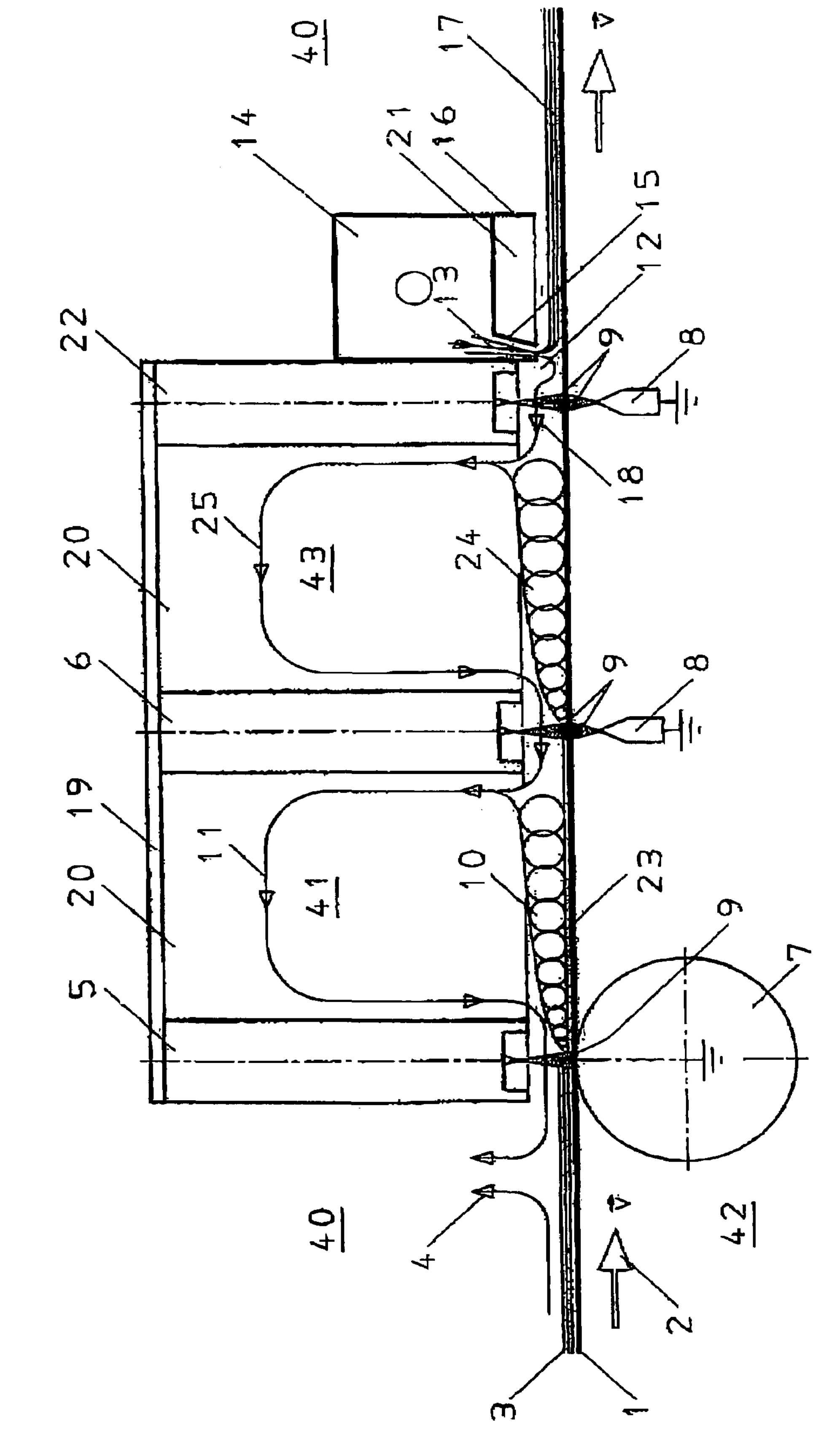
Figure 4:
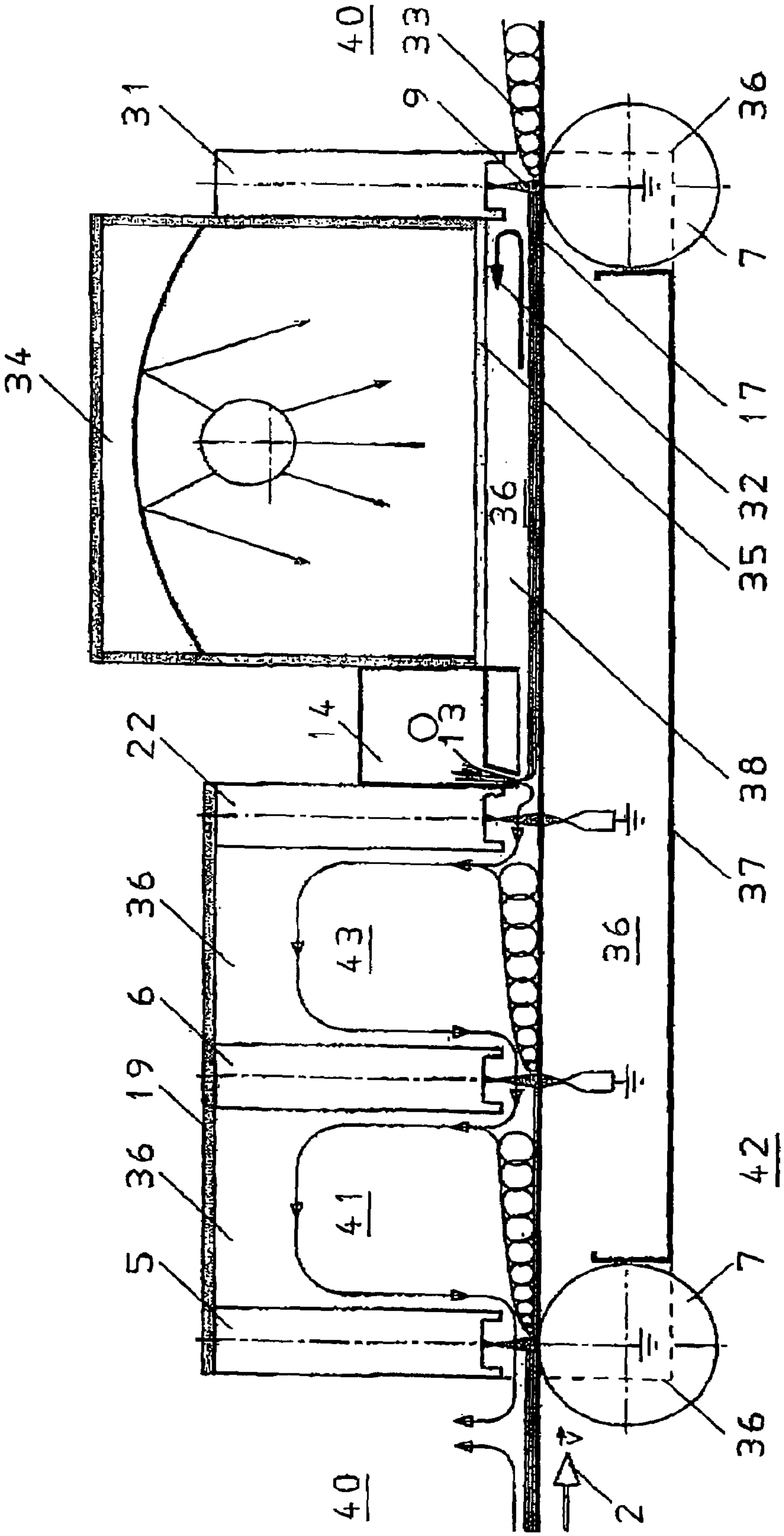

FIG. 1 shows a schematic sideview of a first embodiment mode of the apparatus of the present invention, FIG. 2 shows a schematic front view of the embodiment mode of FIG. 1, FIG. 3 shows a second embodiment mode of the present invention, and FIG. 4 shows a third embodiment mode of the present invention.

FIG. 1 is a schematic section of apparatus of the invention. The substrate 1 moving in the direction 2 of advance acts as a line of material and entrains a laminar air boundary layer 3. The apparatus furthermore comprises a chamber 41 which is open solely toward the substrate 1 and otherwise is enclosed by the surrounding outer space 40 and which comprises a front corona electrode 5 which runs transversely to the direction of advance 2 and is fed with high DC voltage, with a mate electrode 7 on the other side 42 of the substrate 1, said chamber 41 being equipped with a further corona electrode 6 to the rear of the front corona electrode 5 on the same side 40 of the substrate 1 and also to the rear of a further sealing edge perpendicular to the direction of advance 2, said electrode 6 being fed with high DC voltage and with another mate electrode 8 in the form of a quiescent single electrode on the other substrate side 42. Illustratively the front electrode 7 is designed as a grounded guide roller.

In this design, the first chamber 41 consists of the front corona electrode 5 and the further corona electrode 6 and of a single, upper electrode cover 19 covering both said electrodes and of two lateral electrode covers 20 laterally covering the two corona electrodes 5 and 6. The device feeding inert gas, preferably nitrogen, is in the form of an inert gas nozzle 15 and is mounted to the rear of the further corona electrode 6 and parallel to it, said nozzle 15 being I n the vicinity of the substrate 1 and pointing at it.

The inert gas feed comprises an inert gas dispenser 14 connected to the inert gas nozzle 15.

The inert gas dispenser 14 fitted with a rear stop 16 running across the full substrate width and with lateral stops 21 running parallel to the direction of advance 2 and close to the surface of one of the sides of the substrate 1, where the stop 16 perpendicular to the substrate 1 preferably shall be flush with rear end of the inert gas dispenser 14.

The front corona electrode 5 as well as the further electrode 6 each comprise single tip electrodes each located in one plane and mutually distant by a grid pitch as shown in FIG. 2, being connected through current limiting resistors 29 to a grounded high voltage generator 30. This schematic front view also shows the diagrammatic electron/ion flow 9 of FIG. 1 causing the conversion of the laminar flow 3 into the turbulent flow 10. The single tip electrodes of the further corona electrode 6 are offset by half the grid pitch 27 of the distance x/2 relative to the grid pitch 26 of the spacing x of the single tip electrodes of the front corona electrode 5.

In the present invention the laminar air boundary surface 3 entrained by the substrate 1 moving in the direction of advance 2 arrives in the zone of the front coronary electrode 5. The electron/ion flow 9 present at the latter electrode generates the conversion from a laminar into a turbulent state in the form of the turbulent air boundary surface 10 at the surface of the moving substrate 1 at one of this substrate's sides, namely, in the drawing, the upper one, where the front coronary electrode 5 also is configured. The entrained and mostly turbulent air entraining flow 4 is deflected before the front corona electrode 5 upward and away from the moving substrate 1. The turbulent air boundary surface 10 forming to the rear of the front corona electrode 5 is deflected to the rear of and away from the further corona electrode 6 which preferably shall be parallel to the front corona electrode 5—as far as a laminar residual boundary layer 23 entrained farther from the substrate 1 in FIG. 3—perpendicularly to the surface of the moving substrate 1 within the first closed chamber 41 upward as the main flow 11 and oppositely the direction of advance 2 back into the region of the first corona electrode 5. On account of the gaps 28 present between the individual electrode/ion flows 9 of the individual and adjacent tips of the front corona electrode 5, this main air flow 11 arrives—opposite the direction of advance 2—again outside the first chamber 41 into the ambience in the outside space 40 enclosing the first chamber 41 and together with the air entraining flow 4 it will rise before the front corona electrode 5 perpendicularly to the substrate 1.

On account of the so-called scrape-off action by the further corona electrode 6 on the turbulent air boundary layer 10 which takes place at the rear edge of the first and sealed chamber 41, a zone 12 of partial vacuum is produced at the further corona electrode 6 mounted there. The inert gas feed nozzle 15 issuing into this partial vacuum zone in a way aspirates this gas into the partial vacuum zone 12, as a result of which a new laminar layer, this time however in the form of an inert gas and a laminar inert gas boundary layer 17 of low turbulence, builds up above the moving substrate 1. When the quantity of inert gas required to adequately render inert the laminar inert gas boundary layer 17 is adjusted as a function of the speed of the moving substrate in such manner that a slight inert gas leakage flow 18 moves against the direction of advance 2 and will together with the deflected main air flow 11 arrive in the first chamber 41 and finally will reach with it the ambience 40, then the initial partial vacuum zone 12 to the rear of the further coronary electrode 6 will completely fill with inert gas, as a result of which slight excess pressure will arise there and preclude aspirating an air flow from the outside space 40 enclosing the first chamber 41.

The second embodiment mode of FIG. 3 differs from the first one in that a rear corona electrode 22 and a further chamber 43 sealed off by the electrode cover 19 and the two lateral electrode covers 20 is configured between the further corona electrode 6 and the inert gas dispenser 14, i.e. the inert gas nozzle 15, a turbulent residual boundary layer 24 building up in said further chamber 43 beyond the further corona electrode 6, any laminar residual boundary layer 23 beyond the front coronary electrode 5 no longer being detectable.

An inert gas leakage flow 18 is present from the partial vacuum zone 12 toward the rear coronary electrode 22 and together with the upwardly deflected residual air flow 25 moves opposite the direction of advance 2 into the region of the further coronary electrode 6 and from there to the deflected main air flow 11 into the first chamber 41 and from there, as described in relation to FIG. 1, into the outside space 40.

In this embodiment mode and as shown in FIG. 2, the single tip electrodes of the further electrode 6 are offset by half the grid pitch 27 of the offset x/2 relative to the front corona electrode 5 and to the rear corona electrode 22.

The third embodiment mode of FIG. 4 differs from the second embodiment mode of FIG. 3 in that a drier in the form of a UV radiator 34 immediately after the inert gas manifold 14 abuts a quartz pane 35 which seals it off and which runs substantially parallel to the substrate 1, whereby the laminar inert gas boundary surface 17 formed by the inert gas nozzle 15 may positively affect the drying/curing process in the absence of interfering oxygen. In this design the entire assembly may be fitted with a lower cover 37 and two lateral covers 36 running as far as below the substrate 1, and with the sealing corona electrode 31 configured behind the UV radiator 34, as a result of which the laminar inert gas boundary layer 17 is converted into a turbulent inert gas boundary layer 33 and the predominantly turbulent entraining flow of the inert gas 32 is fed back into the space 38 between the quartz pane 35 and the substrate 1. The turbulent inert gas layer 33 exits from the device into the outside space 40.

The invention claimed is:

1. Apparatus to replace atmospheric oxygen with an inert gas from at least one laminar air boundary layer of a substrate moving in a direction of advance said apparatus comprising a first chamber, a front mate electrode, a further mate electrode and an inert gas feeding device, wherein the first chamber is open only toward the substrate, and comprises:

a front corona electrode to which a high-voltage DC is applied and which is positioned perpendicular to said direction of advance, wherein the front corona electrode is configured as a front side wall of the first chamber and is associated with the front mate electrode situated on the other side of the substrate;

a further corona electrode positioned behind the front corona electrode and perpendicular to the direction of advance, wherein the further corona electrode is configured as a rear side wall of the first chamber, is fed with a high DC voltage, and is associated with the further mate electrode situated on the other side of the substrate;

a common upper electrode cover covering both the front corona electrode and the further corona electrode, wherein the common upper electrode cover seals the top of the first chamber and isolates the first chamber from an out-side space; and two lateral electrode covers laterally covering said two corona electrodes;

wherein the first chamber is positioned adjacent to the laminar air boundary layer of the substrate, such that a partial-vacuum zone is formed between a lower end of the further corona electrode and an adjacent surface of the substrate; and the inert gas feeding device is configured to supply the inert gas into said first chamber at a point downstream of the partial-vacuum zone.

2. Apparatus as claimed in claim 1, wherein the inert-gas feeding device comprises an inert gas dispenser and an inert gas nozzle positioned near the substrate and enters the partial-vacuum zone and points at the same.

3. Apparatus as claimed in claim 1, wherein the inert-gas dispenser comprises a rear baffle which runs over the full width of the substrate, and two lateral baffles which run parallel to the direction of advance and are situated near the adjacent surface of the substrate.

4. Apparatus as claimed in claim 3, wherein the rear baffle is flush with the rear termination of the inert-gas dispenser.

5. Apparatus as claimed in claim 1, wherein at least one of the front and further mate electrodes is a grounded roller.

6. Apparatus as claimed in claim 1, wherein at least one of the front and further mate electrodes is a grounded quiescent electrode.

7. Apparatus as claimed in claim 1, wherein the front and further corona electrodes are equally spaced apart by a grid pitch and each comprises single-tip electrodes that are positioned in one plane and that point at the adjacent surface of the substrate.

8. Apparatus as claimed in claim 7, wherein the single-tip electrodes of the further corona electrode are offset by the grid pitch, and the single-tip electrodes of the front corona electrode are offset by a half of the grid pitch.

9. Apparatus as claimed in claim 1, further comprising a rear corona electrode and a rear mate electrode positioned between an inert gas nozzle of the inert gas feeding device and the further corona electrode to form a further chamber.

10. Apparatus as claimed in claim 9, wherein the further chamber comprises the rear corona electrode, the further corona electrode, a further common upper electrode cover that covers said two corona electrodes and two further lateral electrode covers that laterally cover said two corona electrodes.

11. Apparatus as claimed in claim 1, further comprising a UV radiator having a quartz pane, wherein the quartz pane is mounted directly behind an inner gas nozzle of the inert gas feeding device and is positioned parallel to the substrate.

12. Apparatus as claimed in claim 1, wherein the UV radiator, a sealing corona electrode, and a sealing mate electrode are mounted behind the inert gas nozzle on the other side of the substrate.

13. Apparatus as claimed in claim 12, wherein the sealing mate electrode is a grounded guide roller.

14. Apparatus as claimed in claim 12, further comprising a lower lateral cover which extends along the substrate and is positioned on the other side of the substrate, wherein said lower cover on said other side is sealed off by means of a lower chamber cover.

15. Apparatus as claimed in claim 14 wherein the sealing corona electrode, the lower lateral and chamber covers and the mate electrodes acting as guide rollers together define a chamber geometry.

16. Application of the apparatus claimed in claim 1 to gravure printing, flexographic printing, sheet offset printing or roller offset printing and in coating machinery, in the paper and textile industries.

17. Apparatus as claimed in claim 1, wherein the inner space of the first chamber is sealed at top by the electrode cover, and is sealed on all sides by the corona electrodes and the lateral electrode covers, the first chamber is solely opened toward the substrate.

18. Apparatus as claimed in claim 7, wherein the common tip electrodes of the front corona electrode and the voltage applied thereto are configured to convert the laminar air boundary layer into turbulent air.

19. Apparatus as claimed in claim 7, wherein the common tip electrodes of the further corona electrode and the voltage applied thereto are configured to scrape-off a turbulent air boundary layer by forming the partial vacuum zone.

* * * * *